Nov. 23, 1954  N. E. ANDERSON  2,695,148
ADJUSTABLE SUPPORT FOR WELDING APPARATUS
Filed May 3, 1950  4 Sheets-Sheet 1

INVENTOR
NELSON E. ANDERSON
BY
ATTORNEYS

INVENTOR
NELSON E. ANDERSON

Nov. 23, 1954  N. E. ANDERSON  2,695,148
ADJUSTABLE SUPPORT FOR WELDING APPARATUS
Filed May 3, 1950  4 Sheets-Sheet 4

INVENTOR
NELSON E. ANDERSON
BY
ATTORNEYS

United States Patent Office 2,695,148
Patented Nov. 23, 1954

2,695,148

ADJUSTABLE SUPPORT FOR WELDING APPARATUS

Nelson E. Anderson, Berkeley Heights, N. J., assignor to Air Reduction Company, Incorporated, New York, N. Y., a corporation of New York Application May 3, 1950, Serial No. 159,755

12 Claims. (Cl. 248—16)

This invention relates to electric welding apparatus and more particularly to an adjustable mounting for automatic welding machines.

In general an automatic welding machine may comprise a frame or casing supporting a vertically adjustable welding head and carrying mechanism for adjusting the vertical position of the welding head, suitable electrical connections for supplying welding current to the workpiece and to the electrode mounted in the welding head, and means for supplying an inert gas to the welding head to shield the arc. For efficient automatic welding it is necessary to have the welding head accurately positioned directly above the position on the workpiece where the welding operation is to be performed. With the welding head supported in the desired position, the welding operation can be initiated and continued, suitable means being provided for moving the workpiece horizontally while the welding head remains stationary.

This invention is concerned with improvements in the mounting for the welding machine whereby the welding head may be accurately positioned directly above the joint to be welded and then held stationary in this position. In general, this invention includes means for making a rough adjustment of the position of the welding head, and also micropositioning means for making a fine adjustment, so that the operator can position the welding head very accurately over the location where the welding operation is to be performed, this accurate positioning being accomplished by merely adjusting a knob or crank conveniently located in close proximity to the welding head.

The principal object of this invention is to provide an improved adjustable mounting for welding machines, comprising improved mechanism for making a rough adjustment of the angular position of the welding head with respect to the support for the welding machine, and a micropositioning device interconnecting the welding machine with the main support and having a conveniently located manually operable crank or the like for making the desired fine adjustment of the welding machine to position the welding head directly above the joint to be welded.

Other objects of this invention include the provisions of means for preventing play or backlash in the micropositioning mechanism, means for preventing binding of the relatively adjustable parts of the mechanism, and means for preventing shock damage. Apparatus embodying my invention may include a suitable stationary support, preferably mounted in a vertical position, a member carried by this support and movable to a plurality of angular positions with respect thereto, means for securing this member to the support in any desired angular position about the vertical axis thereof, and adjustable micropositioning means interconnecting the said member with the welding machine proper for moving the machine with respect thereto until the welding head of the machine is accurately positioned, and then firmly holding the machine in this adjusted position until such time as it becomes desirable to change the mounting adjustment so that the welding operation may be carried on at another location. My improved micropositioning device may include shock-absorbing means for permitting relative displacement of the parts without danger of breaking any of the mechanism when it is subjected to shock. The micropositioning device is preferably so constructed that backlash or play between the several parts thereof is eliminated, so that the welding head is firmly held in its adjusted position after the adjusting operation has been completed.

A typical embodiment of my invention is illustrated in the accompanying drawings, in which.

In the accompanying drawings I have illustrated a typical electric welding machine comprising a welding head 1 carried by and projecting downward from a casing 2. The welding head 1 carries the welding electrode 3 and the casing 2 may contain the usual apparatus for making the desired vertical adjustments of the welding head to facilitate the starting of the arc and for controlling the vertical position of the welding head during the welding operation whereby the desired arc length is maintained. If the welding machine is of the type in which the electrode is continuously fed toward the workpiece, the casing 2 would also contain the desired electrode feed apparatus, and, if gas shielding is employed, the casing 2 would contain suitable apparatus for supplying the desired quantity of shielding gas to the welding head 1. This invention is not concerned with the construction or arrangement of the various parts of the welding machine proper and accordingly these details are not illustrated in the accompanying drawings.

As explained above, this invention is concerned with improvements in the welding machine mounting whereby the welding machine may be moved or displaced about a vertical support to adjust the position of the welding head 1 so that the welding head and the electrode 3 carried thereby will be located directly over the position where the welding operation is to be performed. In the apparatus illustrated in the accompanying drawing a vertical tubular member 112, integral with, or fixed with respect to the welding machine casing 2, is associated with a vertical supporting means so that the welding machine may be rotated or laterally displaced about the vertical support as desired.

Figure 3:
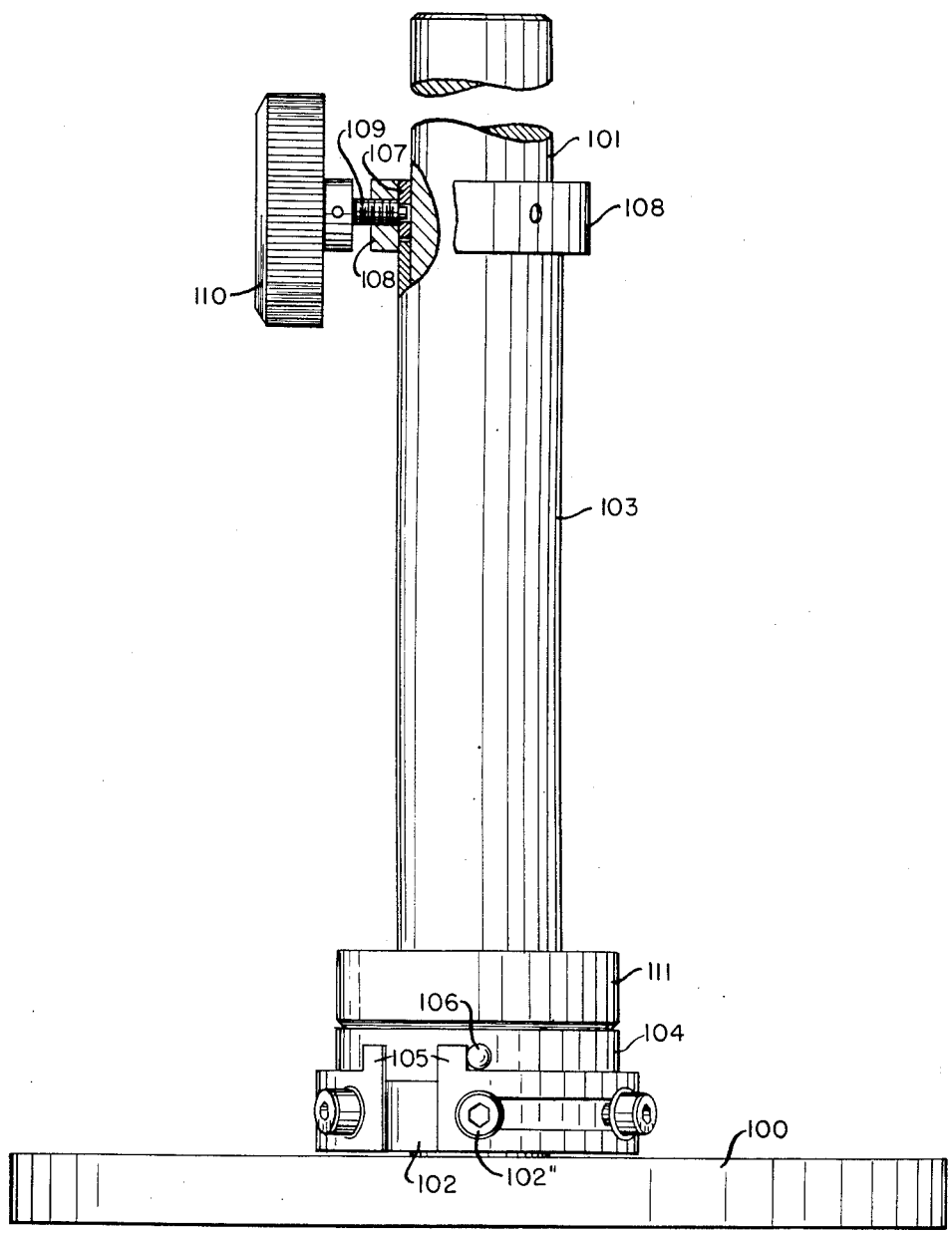
Fig. 3 is an elevation of the main support assembly constituting part of the apparatus illustrated in Fig. 1.

The improved welding machine mounting illustrated in the accompanying drawings comprises a stationary base plate 100 having fixed thereto a vertical cylindrical post 101. A clamping ring or collar 102 is located on this post 101 near the base. A sleeve member 103 is rotatably mounted on the post 101 and carries at the base thereof a collar 104 that is fixed with respect to the sleeve member 103 and which rests upon the clamping ring 102. The clamping ring 102 may be fixed to the post 101 by set screws 102' which are considerably shorter than the tapped holes in ring 102 into which they are threaded. Set screws 102", also considerably shorter than the tapped holes in ring 102, are adapted to be threaded into these same holes to clamp in adjusted positions a pair of slotted limit stops 105 (best illustrated in Fig. 3) which cooperate with a pin 106 carried by the collar 104 fixed to the lower end of the sleeve member 103. These stops 105 serve as rough positioning guides or limit stops for two-positioning repetitive work setups as hereinafter explained.

The sleeve member 103 rotatably mounted on the vertical support post 101 may be fixed with respect to this support, in any desired angular position, by means of an arcuate clamping shoe 107 mounted within a clamping ring 108 carrying a clamping screw 109 connected to the knob 110.

The tubular member 112, which is fixed with respect to the welding machine frame or casing 2, is rotatably mounted on the sleeve member 103. Anti-friction bearing means are preferably provided between these elements. For example, needle point bearings 113 are provided at the top and bottom of the tubular member 112, and a thrust bearing 111 is located at the bottom of the tubular member 112 to provide an anti-friction bearing between the tubular member 112 and the collar 104 on which the anti-friction bearing rests.

Figure 2:
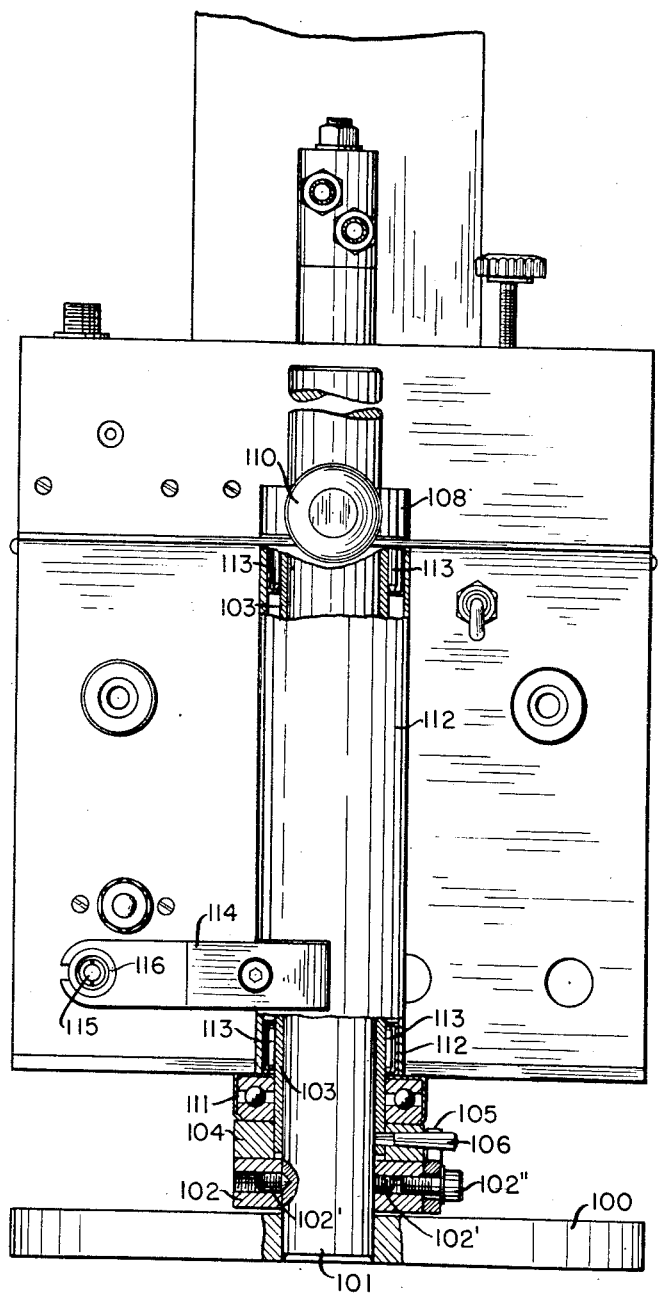
Fig. 2 is an enlarged end elevation of a portion of the apparatus shown in Fig. 1, parts being cut away to show details of construction.
Figure 4:
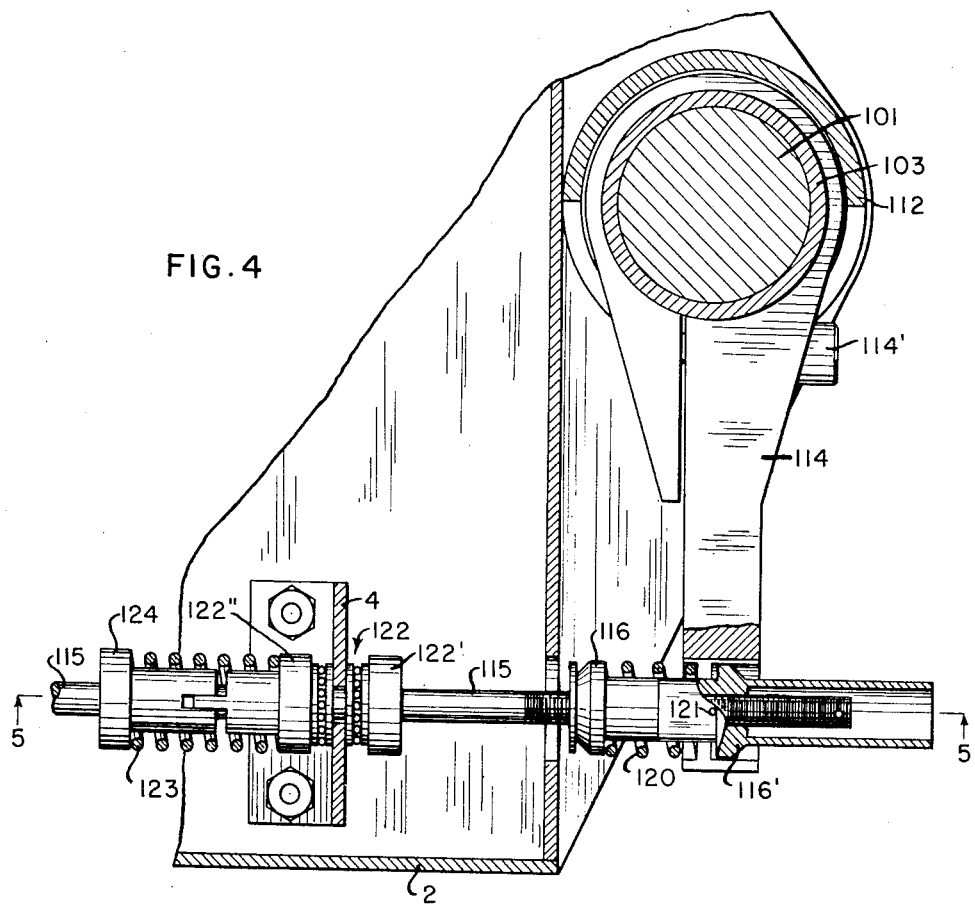
Fig. 4 is an enlarged fragmentary horizontal section view taken on line 4—4 of Fig. 1 showing details of construction of the micropositioning device.

A laterally projecting arm 114, fixed with respect to the sleeve member 103 in any suitable manner as by means of the clamping screw 114', projects outwardly through an opening provided in one side of the tubular member 112, as best illustrated in Figs. 2 and 4. This arm or lever 114 constitutes part of my improved micropositioning device whereby a fine adjustment of the welding machine can be made after the initial rough positioning adjustment has been made. This micropositioning device includes a shaft element 115 interconnecting the welding machine proper with the projecting arm 114 as hereinafter described.

It will be understood that in making an initial rough adjustment of the welding machine, the clamping screw 109 at the top of the sleeve member 103 is released and then the welding machine is free to be moved bodily about the vertical support post 101, this lateral movement being limited only by the pin 106 engaging one or the other of the adjustable stops 105 at the base of the vertical support. After the welding head has been brought to approximately the desired welding position in this manner the knob 110 is turned to tighten the clamping screw 109, thereby firmly clamping the sleeve member 103 to the central vertical support 101. After this rough adjustment has been made, the final micropositioning operation can be performed by the mechanism hereinafter described.

The micropositioning mechanism comprises the shaft element 115 partially supported by a bracket or shaft bearing 4 fixed to the welding machine casing 2. The shaft 115 has what may be characterized as a hinge connection with the arm 114. The shaft 115 is provided with screw threads on that portion thereof in the vicinity of the arm 114 and this screw threaded portion of the shaft cooperates with a pair of internally screw threaded nut elements 116 and 116'. The nut element 116' has an integral rectangular extension passing through a slot in the end of the arm 114, whereby this nut element is restrained from turning when the shaft 115 is turned. This extension of the nut element 116' engages a corresponding slot in an extension in the nut element 116 and this prevents the nut element 116 from turning when the shaft 115 is turned in one direction or the other. A pair of pivot pins 121 carried by the arm 114 engage a flange on the nut element 116' to provide a pivot connection between this nut element and the arm 114. A coil spring 120 is disposed between the nut element 116 and arm 114 and this serves to hold the nut element 116' firmly against the pins 121, thus eliminating any play or backlash in the screw threaded hinge connection between the shaft 115 and the arm 114. Coil spring 120 also has the important function of acting as a shock absorber to cushion any movement of the welding machine toward arm 114.

Figure 1:
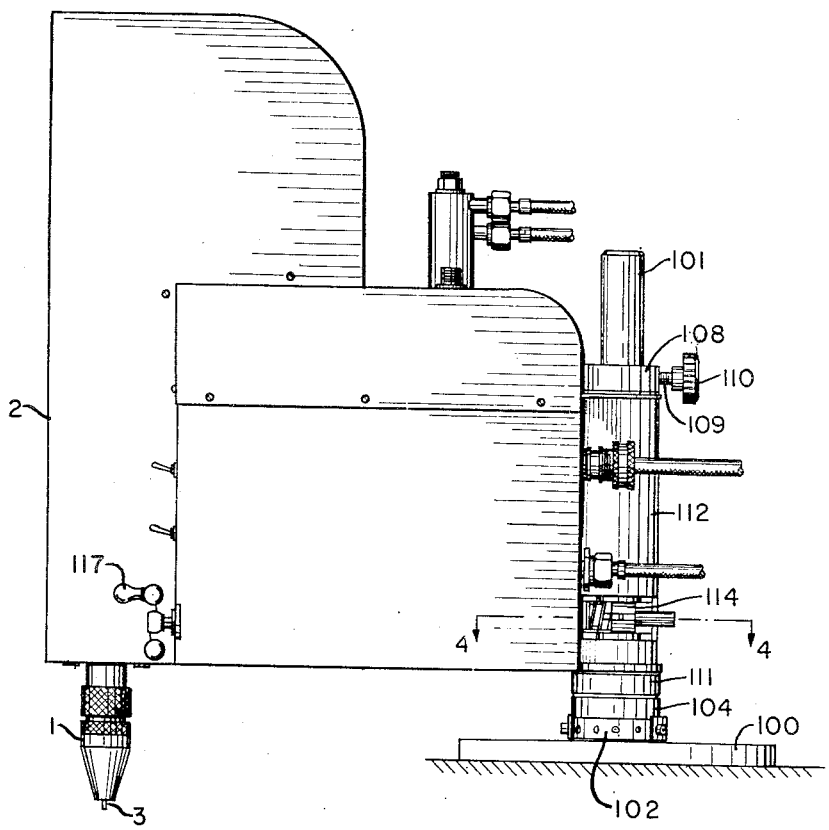
Fig. 1 is a side elevation of an automatic welding machine having associated therewith one form of my improved adjustable mounting mechanism.
Figure 5:
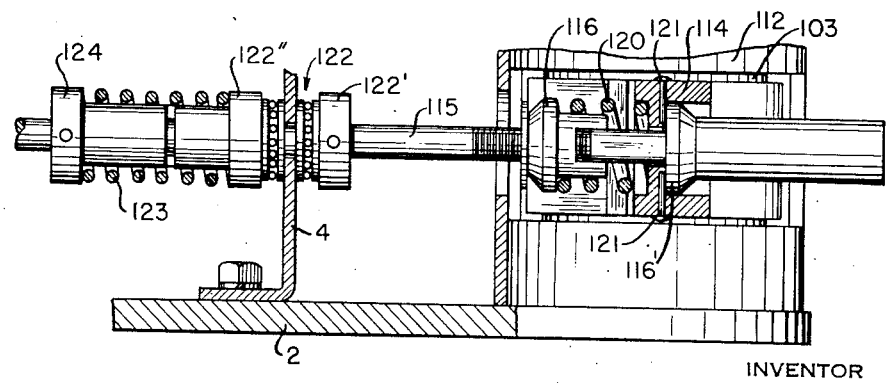
Fig. 5 is an enlarged fragmentary vertical section view taken on line 5—5 of Fig. 4.

A thrust bearing 122 is carried by shaft 115 adjacent bearing bracket 4 of the welding machine casing. The portion 122' of the thrust bearing which lies on the right-hand side of bracket 4, as seen in Figs. 4 and 5, is pinned to the shaft while the portion 122'' thereof which lies on the left-hand side of bracket 4 is freely supported on the shaft and is therefore capable of being moved longitudinally thereon. Portion 122'' of the thrust bearing is urged into engagement with bracket 4 by a spring 123 which is compressed between it and a collar 124 pinned to shaft 115. Thus all end-play is taken out of the connection and a shock absorbing characteristic is lent to the connection, whereby any movement of the welding machine away from arm 114 is cushioned by spring 123. Also, portion 122'' is interlocked with collar 124 by a bayonet and slot connection whereby there is positive drive on this section of the thrust bearing. This is important because there is some friction between this section of the bearing and bracket 4 and if the friction-overcoming torque were applied through spring 123, chatter would result. With the positive drive, however, non-chattering performance is assured. A hand crank 117 (Fig. 1) is supported on the end of shaft 115 remote from arm 114 whereby the shaft may be turned from a point in close proximity to the welding head 3.

After the coarse adjustment of the welding machine has been made as described above, the fine, or microposi-tioning, adjustment is made by merely turning the hand crank 117 in one direction or the other as desired, while observing the position of the electrode 3 carried by the welding head 1. Turning the hand crank 117 in one direction causes the shaft 115 to rotate so that the screw threaded portion thereof advances through the nut elements 116 and 116' thus shortening the effective length of this connecting shaft between the welding machine and the stationary arm 114. In like manner turning the crank 117 in the opposite direction increases the effective length of the connecting shaft to force the welding machine to move gradually away from the stationary arm 114 until the welding head reaches the desired position. The anti-friction bearings provided between the tubular member 112 fixed to the welding machine casing, and the sleeve member 103, provide a minimum of friction between these parts so that the micropositioning adjustment can be made with a minimum of effort by merely turning the hand crank 117 in one direction or the other as required. The micropositioning mechanism is of such a nature that once the desired positioning of the electrode has been attained, the welding head is firmly held in the adjusted position.

It is to be understood that my invention is not limited to the specific illustrative embodiment thereof disclosed in the accompanying drawings but includes such modifications thereof as fall within the scope of the appended claims.

I claim:

1. A mounting for a welding machine comprising a vertical support, a sleeve member carried by said support and movable to a plurality of angular positions about the vertical axis of said support, means for securing said member to said support in any one of said angular positions, a tubular member fixed with respect to the welding machine and concentrically disposed with respect to said sleeve member whereby the welding machine may be moved about the vertical axis of said support, and adjustable micropositioning means interconnecting said sleeve member and the welding machine for gradually moving said machine about the vertical axis of said support to a desired position.

2. A mounting for a welding machine comprising a vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing and hinged to said arm, and means for gradually changing the effective length of said shaft between said arm and bearing.

3. A mounting for a welding machine comprising a vertical supporting means, a laterally projecting arm fixed to said supporting means, means interconnecting the welding machine with said supporting means whereby the welding machine may be moved about the vertical axis of said supporting means to position the welding head of the welding machine, a shaft bearing carried by the welding machine, a shaft mounted in said bearing and having a screw threaded hinge connection with said arm, and manually operable means carried by the welding machine in close proximity to the welding head thereof and connected to said shaft for turning the same to change the effective length of said shaft between said arm and bearing.

4. A mounting for a welding machine comprising vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing and having a screw threaded hinge connection with said arm, and manually operable means for turning said shaft whereby the effective length of said shaft between said arm and bearing may be gradually changed.

5. A mounting for a welding machine comprising a vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing, and a nut pivoted on said arm, said shaft having a screw threaded portion engaged by said nut whereby the effective length of said shaft between said arm and bearing may be changed by turning the shaft, and yielding means for holding said nut in firm engagement with said arm.

6. A mounting for a welding machine comprising a vertical stationary support, a sleeve member carried by said support and movable to a plurality of angular positions with respect thereto, means for securing said sleeve member to said support in any one of said angular positions, a tubular member fixed with respect to the welding machine and rotatably mounted on said sleeve member, anti-friction bearing means between the sleeve member and said tubular member, and adjustable micropositioning means interconnecting said sleeve member and the welding machine for moving said machine about said sleeve member to a desired position.

7. A mounting for a welding machine comprising a vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing and having a screw threaded portion, a pair of internally screw threaded elements engaging the screw threaded portion of said shaft, a spring member disposed between said elements for holding one of said elements in firm engagement with said arm, and means for mechanically interlocking the said screw threaded elements.

8. A mounting for a welding machine comprising a vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing and having a screw threaded portion, a nut on the screw threaded portion of said shaft, pivot pins carried by said arm and means for holding the said nut in firm engagement with said pivot pins.

9. A mounting for a welding machine comprising a vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing and having a screw threaded hinge connection with said arm, a thrust bearing mounted on said shaft about said shaft bearing, spring means mounted on said shaft and engaging said thrust bearing to maintain it in resilient contact with said shaft bearing, and means for turning said shaft whereby the effective length of said shaft between said arm and said shaft bearing may be gradually changed.

10. A mounting for a welding machine comprising a vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing and having a screw threaded hinge connection with said arm, a thrust bearing mounted on said shaft and having two portions which engage the shaft bearing on opposite sides thereof, one of said portions being pinned to the shaft and the other of said portions being freely mounted thereon, spring means mounted on said shaft and engaging the freely mounted portion of the thrust bearing to maintain both portions of the thrust bearing in resilient contact with the shaft bearing, and means for turning said shaft whereby the effective length of said shaft between said arm and said shaft bearing may be gradually changed.

11. A mounting for a welding machine comprising a vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing and having a screw threaded hinge connection with said arm, a thrust bearing mounted on said shaft and having two portions which engage the shaft bearing on opposite sides thereof, the portion of the thrust bearing mounted on the shaft between said shaft bearing and said screw threaded hinge connection being pinned to the shaft and the portion of the thrust bearing on the other side of the shaft bearing being freely mounted on the shaft, a collar pinned to said shaft beyond said freely mounted portion of the thrust bearing, said collar and said freely mounted portion of the thrust bearing being mechanically interlocked, a spring mounted on said shaft and compressed between said collar and said freely mounted portion of the thrust bearing to maintain both portions of the thrust bearing in resilient contact with the shaft bearing, and means for turning said shaft whereby the effective length of said shaft between said arm and said shaft bearing may be gradually changed.

12. A mounting for a welding machine comprising a vertical supporting means, a laterally projecting arm fixed to said supporting means, means interconnecting the welding machine with said supporting means whereby the welding machine may be moved about the vertical axis of said supporting means, a shaft bearing carried by the welding machine, a shaft mounted in said bearing and having a screw threaded portion, a pair of internally screw threaded elements engaging the screw threaded portion of said shaft, a spring member disposed between said elements for holding one of said elements in firm engagement with the arm, means for mechanically interlocking the said screw threaded elements, a thrust bearing mounted on said shaft about said shaft bearing, spring means mounted on said shaft and engaging said thrust bearing to maintain it in resilient contact with said shaft bearing, and means for turning said shaft whereby the effective length of said shaft between said arm and said shaft bearing may be gradually changed.

References Cited in the file of this patent

UNITED STATES PATENTS

| Number | Name | Date |
|---|---|---|
| 1,983,321 | Stephens et al. | Dec. 4, 1931 |
| 2,182,575 | Baird et al. | Dec. 5, 1939 |
| 2,250,219 | Chapman et al. | July 22, 1941 |
| 2,470,429 | Carlson | May 17, 1949 |
| 2,488,282 | Forsman | Nov. 15, 1949 |